United States Patent [19]
Sakura

[11] Patent Number: 6,122,684
[45] Date of Patent: *Sep. 19, 2000

[54] NETWORK SCANNER SYSTEM PROVIDING READ INSTRUCTION TO PLURALITY OF SCANNERS TO READ DIVIDED ORIGINALS AND PROVIDING RE-ARRANGING ORDER INPUT FOR RE-ARRANGING INFORMATION OF THE ORIGINALS

[75] Inventor: Masayuki Sakura, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/994,998

[22] Filed: Dec. 19, 1997

[30] Foreign Application Priority Data

Dec. 27, 1996 [JP] Japan .................. 8-350378

[51] Int. Cl.⁷ .............. G06F 13/10; G06F 13/22
[52] U.S. Cl. ................. 710/73; 710/15; 710/17; 358/450
[58] Field of Search .................. 710/1, 72, 73, 710/17, 15; 358/450

[56] References Cited

U.S. PATENT DOCUMENTS

| | | | |
|---|---|---|---|
| 4,727,402 | 2/1988 | Smith | 355/14 SH |
| 5,669,056 | 9/1997 | Rubscha | 399/367 |
| 5,721,624 | 2/1998 | Kumashiro et al. | 358/450 |
| 5,768,483 | 6/1998 | Maniwa et al. | 395/114 |
| 5,841,548 | 11/1998 | Mitome et al. | 358/296 |

*Primary Examiner*—Thomas C. Lee
*Assistant Examiner*—Rehana Perveen
*Attorney, Agent, or Firm*—Fitzpatrick, Cella, Harper & Scinto

[57] ABSTRACT

A network scanner system and original reading method, which can efficiently use time and hardware resources, and can efficiently input originals consisting of a plurality of pages. When a personal computer (100) reads originals using N scanners (200) to which are connected via a LAN and each of which has an automatic document feeding facility, for example, 100 pages of originals are divided into three groups in correspondence with three scanners (200) used for reading, a re-arranging order of three bundles of divided originals set on the three scanners is input to the personal computer (100), and thereafter, a reading instruction for reading the divided originals is supplied to the three scanners (200). In accordance with this instruction, the scanners are controlled to read the set originals. When the three scanners transfer information of the read divided originals to the personal computer (100) via a transmission path (300), the personal computer (100) re-arranges the transferred original information in the order of pages in accordance with the input re-arranging order.

21 Claims, 6 Drawing Sheets

| ORIGINAL SET | SCANNER NAME | RE-ARRANGING ORDER |
|---|---|---|
| ✓ | WORK ROOM SCANNER 1 | 2 |
|  | WORK ROOM SCANNER 2 |  |
| ✓ | WORK ROOM SCANNER 3 | 1 |
|  | WORK ROOM SCANNER 4 |  |
|  | WORK ROOM SCANNER 5 |  |
|  | OFFICE SCANNER 1 |  |
| ✓ | OFFICE SCANNER 2 | 3 |
|  | OFFICE SCANNER 3 |  |
|  | OFFICE SCANNER 4 |  |
|  | OFFICE SCANNER 5 |  |
|  | EXPERIMENT ROOM SCANNER 1 |  |
|  | EXPERIMENT ROOM SCANNER 2 |  |

CANCEL    SCAN

| SCANNER NAME 32 | RECOMMENDED NUMBER OF PAGES 53 | ORIGINAL SET | RE-ARRANGING ORDER | TOTAL NUMBER OF PAGES OF ORIGINALS 51 : 100 |
|---|---|---|---|---|
| WORK ROOM SCANNER 1 | 40 | ✓ | 2 | |
| WORK ROOM SCANNER 3 | 30 | | | |
| OFFICE SCANNER 2 | 30 | ✓ | 1 | |

(SCAN SEARCH) 56    (CANCEL) 35    (SCAN) 34

NETWORK SCANNER SYSTEM PROVIDING READ INSTRUCTION TO PLURALITY OF SCANNERS TO READ DIVIDED ORIGINALS AND PROVIDING RE-ARRANGING ORDER INPUT FOR RE-ARRANGING INFORMATION OF THE ORIGINALS

BACKGROUND OF THE INVENTION

This invention relates to a network scanner system and an original reading method.

Connected to a network and equipped with an automatic document feeder, a conventional network scanner scans and inputs an original document consisting of a plurality of pages as follows. That is, (1) all the pages of the document are set on a single scanner, and are scanned and input. (2) Alternatively, when a plurality of scanners are used, the respective pages of the document are divisionally scanned and input by the individual scanners, and the input image data are re-edited using a personal computer or the like, so that the read images are properly arranged in the page order.

However, in the above-mentioned prior art, for example, when a document consisting of a plurality of pages is input using a single scanner, since other scanners are not used, it is inefficient in terms of efficient use of time and hardware resources.

Furthermore, when using a single scanner, since a possible number of pages of the document to be set at a time in an automatic document feeder is limited, if a large number of pages of the document has to be input, a user must repeat the same input procedure many times. Thus is time-consuming.

On the other hand, when a document is divisionally scanned and input using a plurality of scanners, the user must re-edit the divisionally input document data after scanning, and time-consuming, troublesome works remain.

SUMMARY OF THE INVENTION

Accordingly, it is an object of the present invention to provide a network scanner system and original reading method, which can effectively use time and hardware resources, and can efficiently input an original consisting of a plurality of pages.

According to one aspect of the present invention, the foregoing object is attained by providing a network scanner system built by connecting at least one computer and N scanners each with an automatic document feeding facility via a network, comprising first input means for dividing M pages of originals into L bundles of the originals in correspondence with L number of scanners used for original reading, and inputting a re-arranging order of the L bundles of divided originals set on the L scanners to the computer, first instruction means for instructing the L scanners to read the divided originals, reading control means for controlling the L scanners to read the M pages of the originals in accordance with an input instruction from the first instruction means, transfer means for transferring information of each of the L bundles of the divided originals read by the L scanners to the computer via the network, and re-arranging means for re-arranging the information of the originals transferred to the computer by the transfer means in accordance with the re-arranging order input by the first input means.

Furthermore, the above arrangement may also comprise display means for displaying scanner names of the N scanners connected to the network on a screen.

At this time, the display means may display the scanner names in a table format on the screen, and may display, on the table, an instruction column of the re-arranging order of the divided originals, and a confirmation column used by a user to inform the computer that the user has set originals on the L scanners. The first input means may input the re-arranging order in the instruction column and the second input means may input the user's confirmation in the confirmation column.

Also, for example, the system may additionally comprise checking means for detecting available scanners from the N scanners on the bases of an instruction from an external, and the display means may display only the scanner names of the available scanners on the basis of the checking result of the checking means.

Moreover, the M pages of originals to be read may be input to the computer, optimal numbers of pages of originals to be read by the available scanners may be calculated on the basis of the value of the M and performances of the available scanners, and the display means may display the calculation result as the recommended numbers of divided pages. Note that the optimal numbers are determined to attain the highest original reading speed as the whole system.

In addition, the checking means may determine the available scanners also in consideration of distances between the computer and the N scanners.

According to another aspect of the present invention, the foregoing object is attained by providing an original reading method using a system built by connecting at least one computer and N scanners each with an automatic document feeding facility via a network, comprising a first input step of dividing M pages of originals into L bundles of the originals in correspondence with L number of scanners used for original reading, and inputting a re-arranging order of the L bundles of divided originals set on the L scanners to the computer, a first instruction step of instructing the L scanners to read the divided originals, a reading control step of controlling the L scanners to read the M pages of the originals in accordance with an input instruction in the first instruction step, a transfer step of transferring information of each of the L bundles of the divided originals read by the L scanners to the computer via the network, and a re-arranging step of re-arranging the information of the originals transferred to the computer in the transfer step in accordance with the re-arranging order input in the first input step.

Furthermore, the method may also comprise a checking step of detecting available scanners from the N scanners; a second input step of inputting the M pages of originals to be read to the computer; and a display step of displaying optimal numbers of pages of originals to be read by the available scanners as recommended numbers of pages on the basis of the value of M and performances of the available scanners.

In accordance with the present invention as described above, when original reading is done using a system built by connecting at least one computer and N scanners each with an automatic document feeding facility via a network, M pages of originals are divided into L bundles of the originals in correspondence with L number of scanners used for original reading, the reading order of the L bundles of divided originals set on the L scanners is input to the computer, and the user then instructs the L scanners to read the divided originals. In accordance with the instruction, the L scanners are controlled to read the M pages of the originals, and individually transfer information of the read divided original images to the computer via the network.

The computer re-arranges the transferred original information in accordance with the input re-arranging order.

The invention is particularly advantageous since the divisionally read original images need not be manually re-arranged in the page order, and many originals can be read at high speed efficiently using system resources without requiring any complicated operations.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of the present invention will now be described in detail in accordance with the accompanying drawings.

Figure 1:
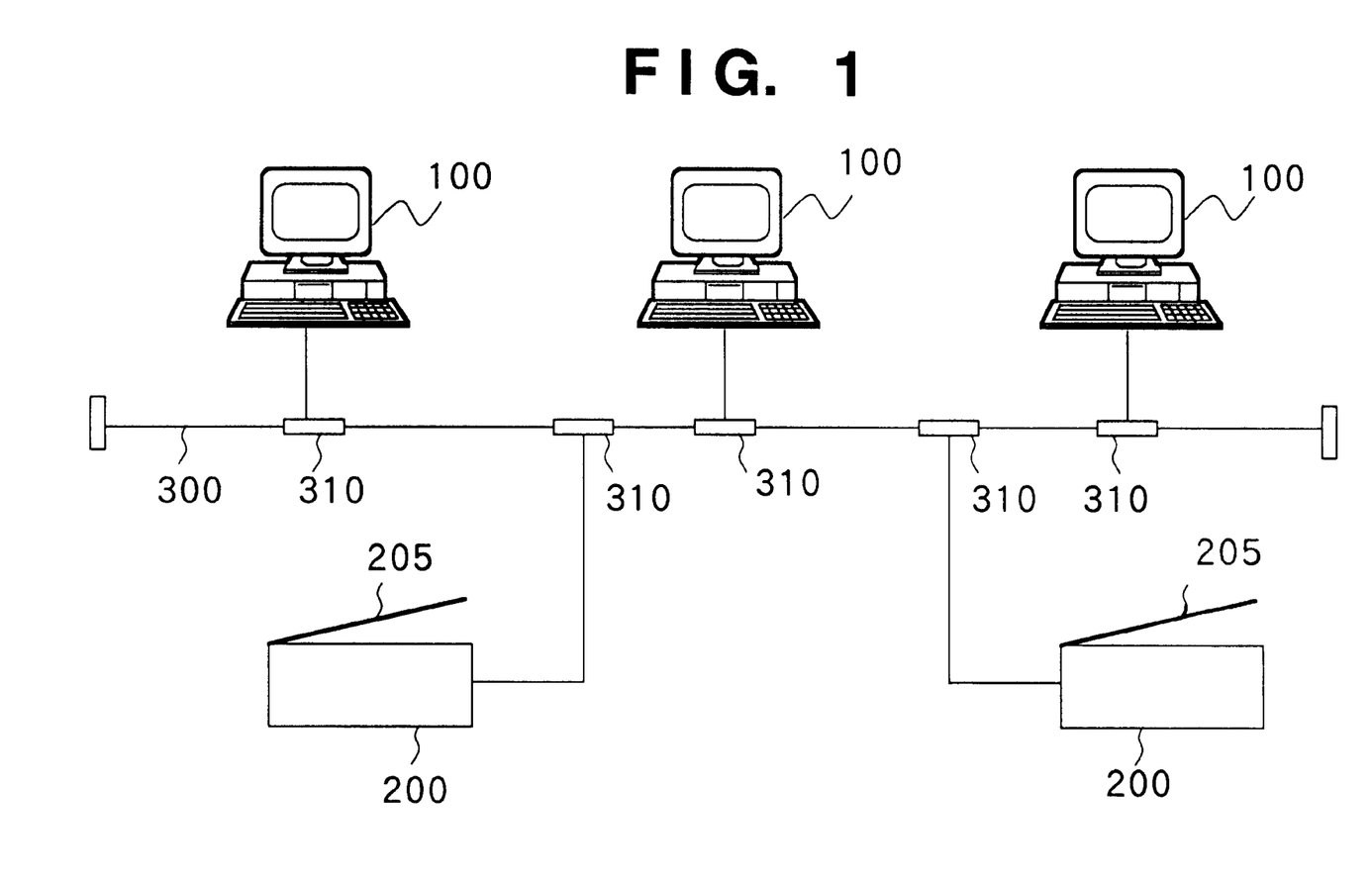
FIG. 1 is a block diagram showing the arrangement of a network scanner system as a typical embodiment of the present invention.

FIG. 1 is a block diagram showing the arrangement of a network scanner system (to be simply referred to as a system hereinafter) to which the present invention is applicable.

As shown in FIG. 1, in the system a plurality of personal computers 100 and a plurality of scanners 200 are connected via a common transmission path 300 such as a coaxial cable, optical cable, or the like. Note that actual connections are done via network adapters (ADPs) 310. The individual constituting elements form a network by a LAN such as Ethernet, and can exchange information using a protocol such as TCP/IP or the like. Each scanner 200 comprises an automatic document feeder, and when a plurality of pages of original are set on a paper feed tray 205 of the scanner 200, the scanner 200 can sequentially read these original pages one by one.

In each personal computer 100, a software program that receives image data generated based on a scanned input image original via data communications with the plurality of scanners 200, and can execute image processing is installed and executable. Meanwhile, in each scanner 200, a software program which executes image processing such as density correction and gradation conversion and processing for transferring generated image data to the personal computer 100 via data communications with the personal computer 100 is installed and executable.

Normally, in the scanner 200, when the power switch is turned on, the above-mentioned software program is automatically activated and ready to execute processing.

Note that FIG. 1 depicts only three personal computers and two scanners, for the sake of simplicity. Normally, m personal computers and n scanners are connected to the system. Note that m and n are positive integers. Hence, the installation places of these personal computers and scanners can be flexibly changed. For example, the individual personal computers are installed on system users' desks, $n_1$ scanners are installed in another work room, and $n_2$ scanners are installed in an experiment room.

Figure 2:
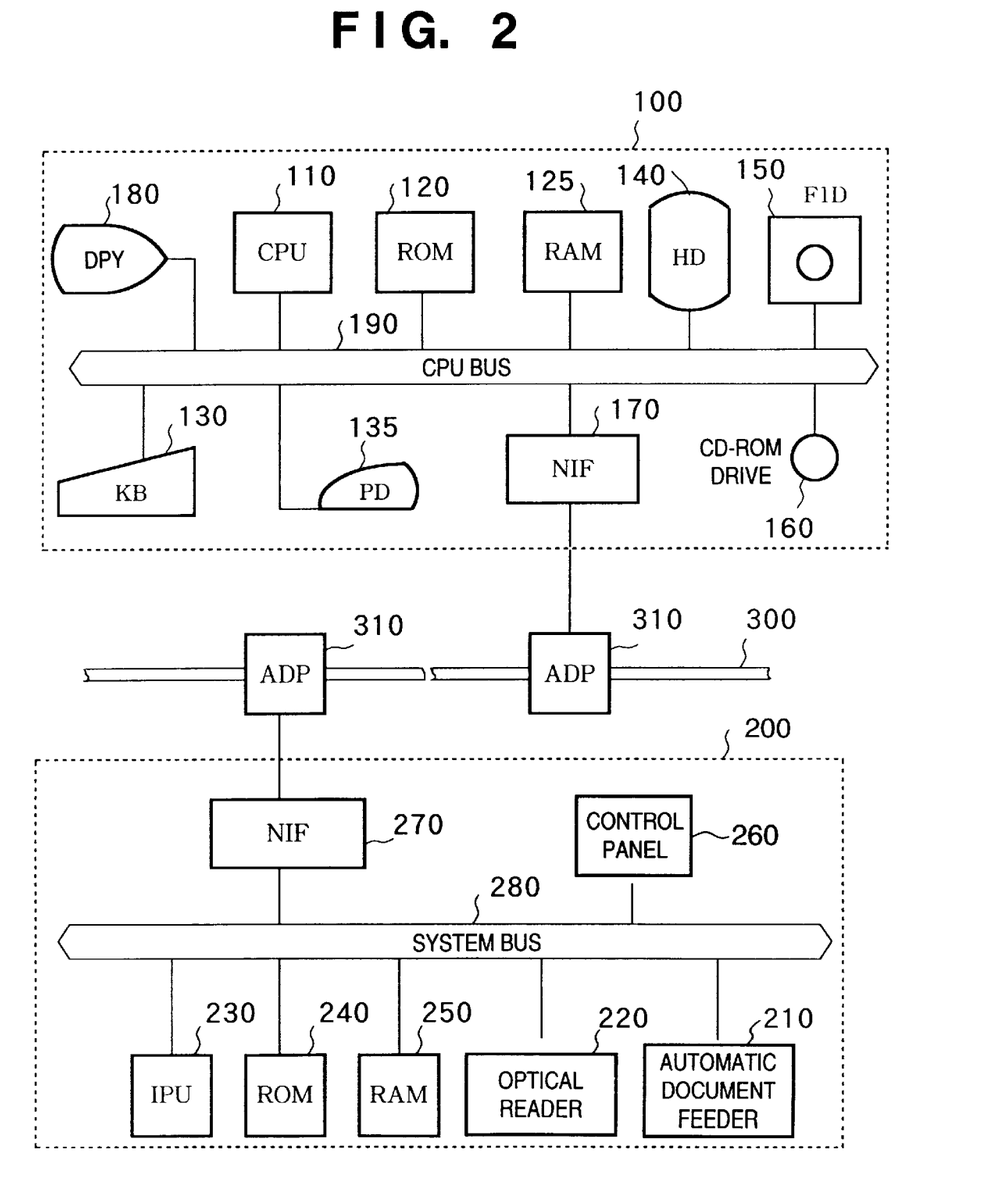
FIG. 2 is a schematic block diagram showing the general arrangement of a personal computer 100 and scanner 200.

FIG. 2 is a schematic block diagram showing the general arrangement of the personal computer 100 and scanner 200.

As shown in FIG. 2, the personal computer 100 comprises a CPU 110 for controlling the overall apparatus and executing, e.g., image original reading (to be described later) by executing various processing programs, a ROM 120 that stores a control program, processing program, and various constants, a RAM 125 used as a work area upon executing the control program and processing program, a keyboard (KB) 130 for making various instructions, data inputs, and the like, a pointing device (PD) 135 such as a mouse for performing various screen operations, a hard disk (HD) 140 for storing a large volume of data, a floppy disk (FD) 150 used for, e.g., backing up data, a CD-ROM drive 160 for inputting information on a CD-ROM, a network interface (NIF) 170 connected to the network adapter (ADP) 310 to make data communications with other apparatuses via the LAN, a display (DPY) 180 such as a CRT, LCD, or the like for displaying various kinds of information, for example, menus and messages associated with image original reading (to be described later), and a CPU bus 190 for interconnecting these constituting elements.

On the other hand, the scanner 200 comprises an automatic document feeder 210 which comprises the paper feed tray 205 and automatically feeds image originals, an optical reader 220 for optically reading an image of the fed original, an image processing processor (IPU) 230 for controlling the entire apparatus and performing, e.g., image original reading (to be described later) by executing an image processing program, a ROM 240 that stores a control program, processing program, and various constants, a RAM 250 used as a work area upon executing the control program and processing program, a control panel 260 having keys for inputting various instructions, an LCD for displaying a message from the apparatus, LEDs for indicating the apparatus status, and the like, a network interface (NIF) 270 connected to the network adapter (ADP) 310 to make data communications with other apparatuses via the LAN, and a system bus 290 for interconnecting these constituting elements.

Since a plurality of personal computers of the same type and a plurality of scanners of the same type are connected to the above-mentioned system, these personal computers and scanners have unique identifiers (IDs) on the system to identify these constituting apparatuses on the system.

Figure 3:
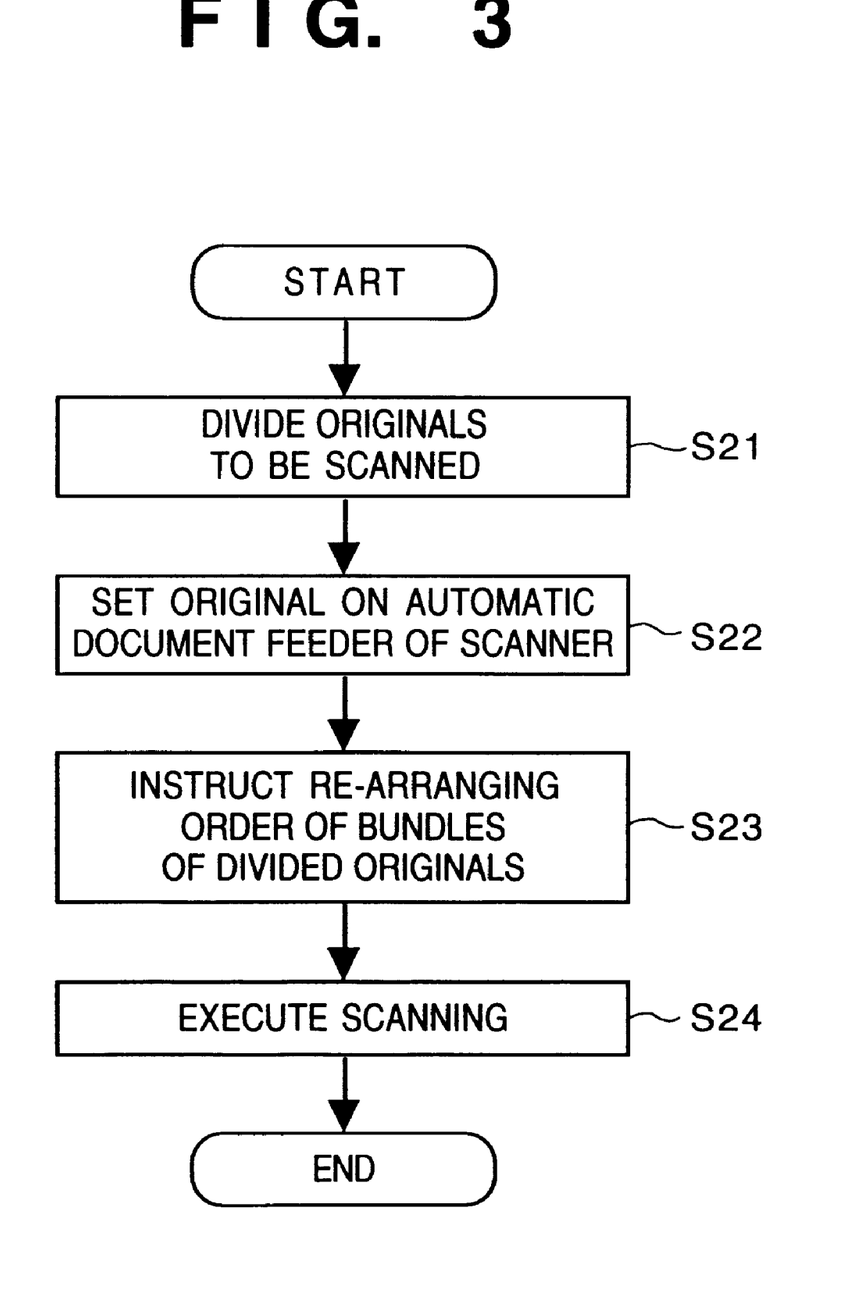
FIG. 3 is a flow chart showing image original reading.
Figure 4:
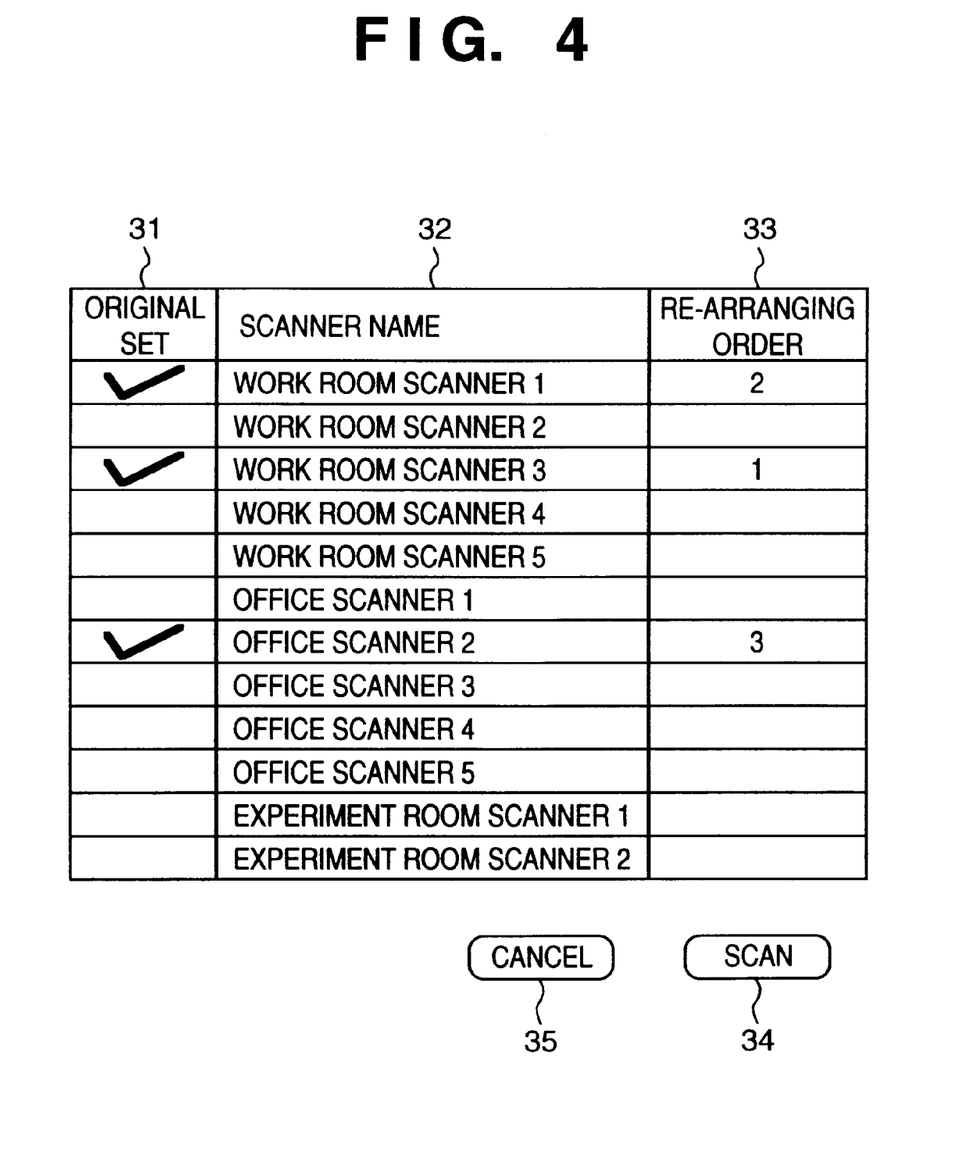
FIG. 4 shows a display example on a display screen.

Image original reading using the system with the above-mentioned arrangement will be explained below with reference to the flow chart shown in FIG. 3 and the display screen shown in FIG. 4. FIG. 4 shows a table, listing installation sites of a plurality of scanners, which is displayed on the display screen of the display (DPY) 180. Such table is displayed when the personal computer 100 executes an image original reading program (to be simply referred to as a program hereinafter). This displayed table includes a column 32 that shows available scanner names at the time of execution of the program, a column 33 for designating the original order to be arranged in the system, and an original set check column 31 that informs the program of whether or not originals are set on scanners.

Note that the available scanners can be obtained by checking the operation status of the scanners by making program communications between the program and all power-on and operable scanners connected to the system via the LAN at the time of, e.g., activating the program.

Assume that the program has already been activated on a single personal computer, and a user inputs total 100 pages of originals using the scanners.

The user determines the scanners used for original input. In this case, the user selects three scanners, i.e., "work room scanner 1", "work room scanner 3", and "office scanner 2", from the list shown in FIG. 4.

After the scanners used are determined in this way, the user divides 100 pages of originals in correspondence with the number of scanners used, i.e., into three bundles, in step S21, and sets the divided original bundles on the automatic document feeders of the scanners used in step S22. Assume that the user sets a bundle of originals corresponding to the first to 40th pages on "work room scanner 3", another bundle of originals corresponding to the 41st to 70th pages on "work room scanner 1", and still another bundle of originals corresponding to the 71st to 100th pages on "office scanner 2".

In step S23, the user sets the re-arranging order of these bundles of originals in the image original reading program using the keyboard (KB) 130 and pointing device (PD) such as a mouse while observing the display screen of the display (DPY) 180 of the personal computer 100. The table shown in FIG. 4 indicates that the user instructs the re-arranged order of "work room scanner 3" (first), "work room scanner 1" (second), and "office scanner 2" (third). This order is concordant with the fact that the user set the first to 40th pages of the originals on "work room scanner 3", the 41st to 70th pages of the originals on "work room scanner 1", and the 71st to 100th pages of the originals on "office scanner 2".

Furthermore, the user assigns check marks in the original set check column 31 in correspondence with the scanners on which he or she set originals. These marks are assigned by moving a cursor to the corresponding position of that column using the pointing device (PD) 135 and clicking a button of the pointing device (PD) 135 at that position.

After such setups, the user instructs execution of scan input in step S24. This execution instruction is issued when the user clicks a scan button 34 displayed beneath the table on the display screen using the pointing device (PD) 135. In response to this execution instruction, the image original reading program issues image original reading instructions to the selected scanners to execute their original reading. The program receives the read image data from the scanners, and re-arranges the received images in the page order of the originals on the RAM 125 of the personal computer 100 in accordance with the instructions input in step S23.

Note that a cancel button 35 in FIG. 4 is displayed underneath the table on the display screen, and is used for canceling execution of scan input.

According to the above-mentioned embodiment, a plurality of scanners divisionally read a plurality of bundles of originals, and the personal computer which receives the read image data re-arranges the received image data in the page order of the originals in accordance with the instruction so that the page order of the read originals becomes proper as originally intended by a user. For this reason, even when each scanner has low scanning speed, large quantities of document can be concurrently read at high speed using a plurality of available scanners, and the read data need not be manually re-edited in the order of original pages.

Since a plurality of available scanners are used, the hardware resources can be effectively used.

Another Embodiment

Figure 5:
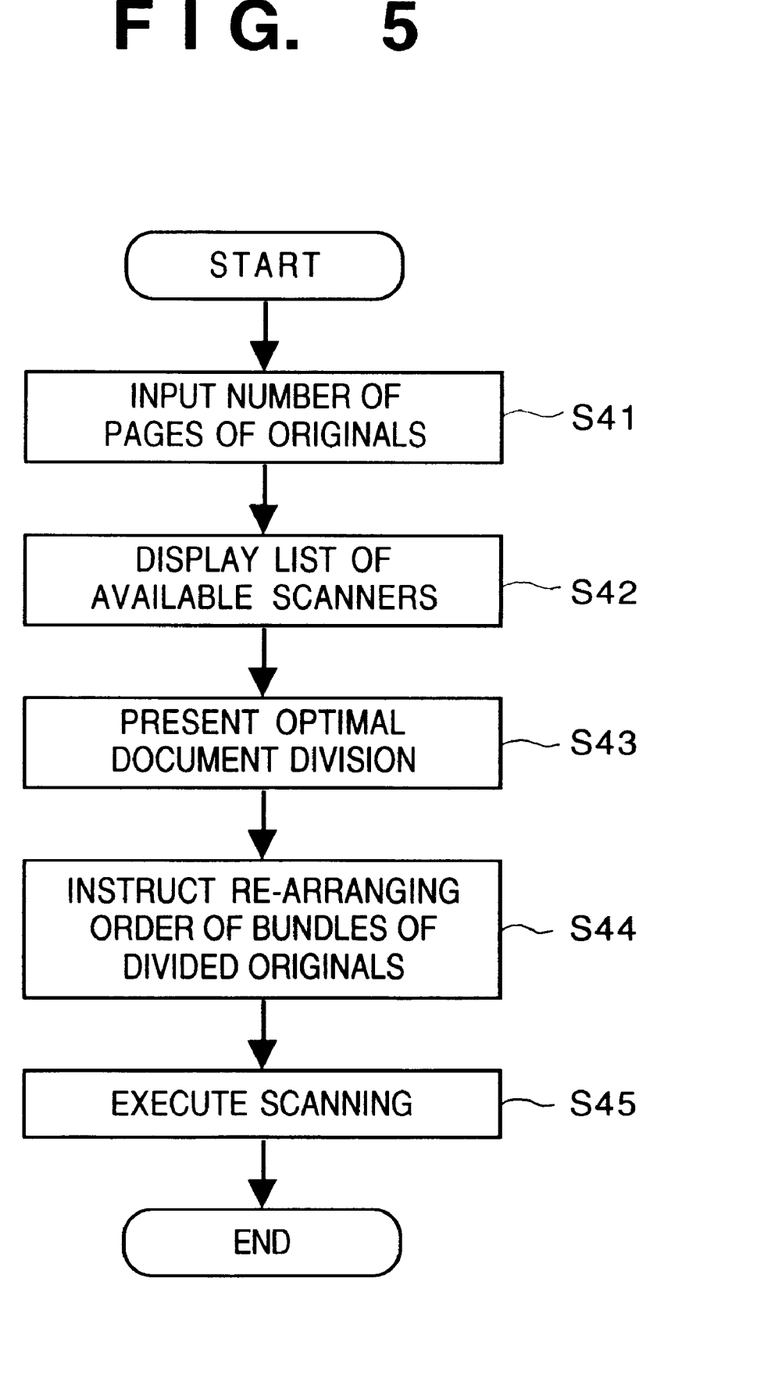
FIG. 5 is a flow chart showing image original reading according to another embodiment of the present invention.

Another image original reading executed when a plurality of originals are read using a plurality of scanners in the system shown in FIGS. 1 and 2 will be described below with reference to the flow chart shown in FIG. 5 and the display screen shown in FIG. 6. Assume that an image original reading program (to be simply referred to as a program hereinafter) has already been activated on a single personal computer, and the system user inputs 100 pages of originals using scanners as in the above embodiment.

As in the above embodiment, the system user sets the re-arranging order of a plurality of bundles of originals using the list of installation sites of a plurality of scanners and some buttons displayed on the display screen. Note that the same reference numerals denote the same columns in the table and buttons shown in FIG. 6 as those described in the above embodiment, and a detailed description thereof will be omitted.

Figure 6:
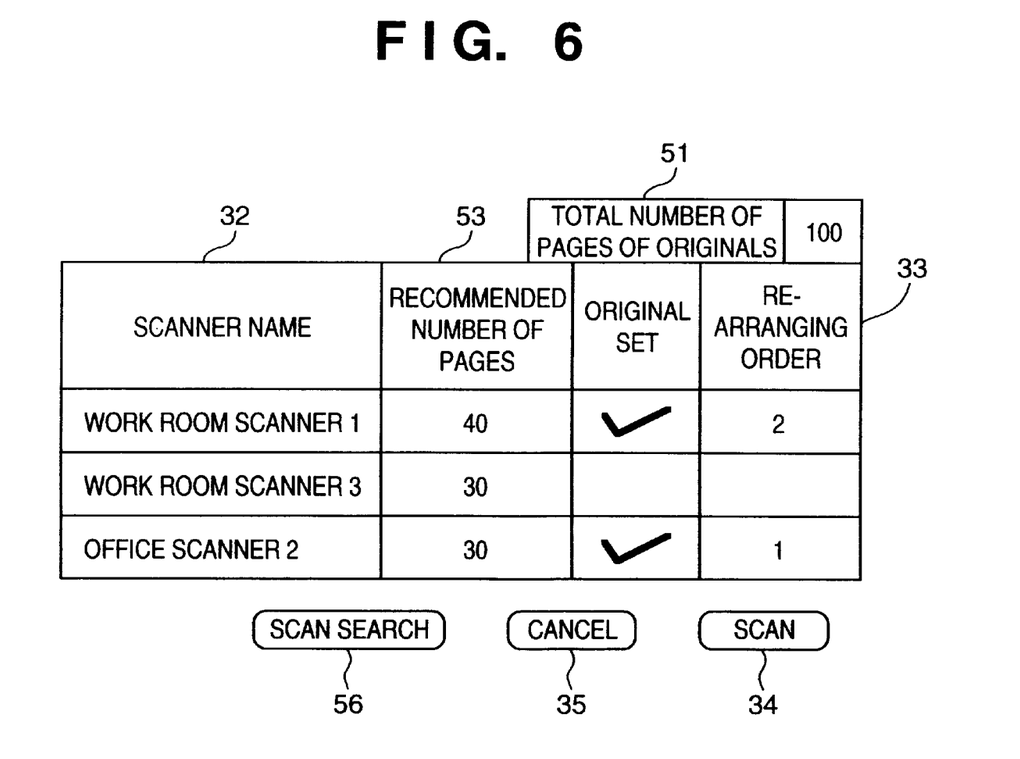
FIG. 6 shows a display example on a display screen according to another embodiment of the present invention.

In this embodiment, when the program is activated on the personal computer, the table and buttons shown in FIG. 6 are displayed on the display. At the time of activating the program, the contents of the individual columns are blank. In FIG. 6, reference numeral 51 denotes a column in which the total number of pages of the originals to be read by scanners is set; 53, a column that indicates the recommended number of pages of each scanner shown in the table; and 56, an instruction button for searching for currently available scanners in the system.

The user inputs the total number of pages ("100" in this case) of the originals to be read in the column 51 using the keyboard (KB) 130 and the pointing device (PD) 135 in step S41. When the user clicks the instruction button 56 using the pointing device (PD) 135, in step S42 the program displays a list of currently available scanners on the basis of apparatus status data acquired from the scanners connected to the system in accordance with the input instruction. In the scanner name column 32 in FIG. 6, "work room scanner 1", "work room scanner 3", and "office scanner 2" are listed as those which are available. Note that the apparatus status data of each scanner is obtained as follows, for example.

The software program installed in each scanner monitors its own apparatus status. When the scanner is available, the software program issues a status signal indicating the ready state to all the personal computers of the system. On the other hand, when the scanner is occupied by a certain scanner to do reading, the software program issues a status signal indicating the busy state to all other personal computers.

On the other hand, each personal computer receives such status signals from all power-on and operable scanners, and determines available scanners, based on the status signals. The above-mentioned processing is done in cooperation with the LAN protocol employed by the system and the software programs installed in the personal computers and scanners.

Furthermore, in step S43, the program displays an optimal document division in the column 53 on the basis of performances of the individual scanners set when they have been introduced into the system. In the example shown in FIG. 6, the highest-speed scan can be done in the whole system when 40 pages of the originals are set on "work room scanner 1", 30 pages on "work room scanner 3", and 30 pages on "office scanner 2".

In step S44, the user sets the re-arranging order of divided bundles of originals to be read in the column 32. In this case, the system user may use all the available scanners in accordance with the recommended numbers of original pages by the program but need not follow that recommendation after he or she gives a consideration to the information. For example, in consideration of the installation site of the personal computer that the user himself or herself is using, the user may select only "work room scanner 1" and "work room scanner 3" without using "office room scanner 2" which is distant from his or her personal computer, as shown in FIG. 6. In this case, the user assigns check marks to "work room scanner 1" and "work room scanner 3" in the column 31. Then, the user sets, for example, the first to 50th pages of the originals on "work room scanner 3" and the 51st to 100th pages of the originals on "work room scanner 1".

After the above-mentioned setups, the user instructs execution of scan input in step S45. This execution instruction is issued when the user clicks a scan button 34 using the pointing device (PD) 135, as shown in FIG. 6. In response to this execution instruction, the image original reading program issues image original reading instructions to the selected scanners to execute their original reading. The program receives the read image data from the scanners, and re-arranges the received images in the page order of the originals on the RAM 125 of the personal computer 100 in accordance with the instructions input in step S44.

According to the above-mentioned embodiment, when a plurality of originals are divided into a plurality of bundles of the originals, and the divided bundles of originals are respectively scanned and input using a plurality of scanners, optimal numbers of pages in units of scanners that can attain the highest reading speed as the system can be presented in consideration of the performances of the individual scanners. If the user divides the originals in accordance with such presentation, original reading can be attained at the highest speed.

Since the user can ignore such presentation depending on the scanners' installation sites if so desired, a user's request can be flexibly coped with.

Furthermore, upon setting up the system environment, the installation sites and distances between the personal computers and scanners may be set in the software programs on the personal computers and scanners, and available scanners may be displayed in consideration of the distances.

The objects of the present invention are also achieved by supplying a storage medium, which stores a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by a part or all of actual processing operations executed by an OS (operating system) running on the computer on the basis of an instruction of the program code.

Furthermore, the functions of the above-mentioned embodiments may be realized by a part or all of actual processing operations executed by a CPU or the like arranged in a function extension board or a function extension unit, which is inserted in or connected to the computer, after the program code read out from the storage medium is written in a memory of the extension board or unit.

As many apparently widely different embodiments of the present invention can be made without departing from the spirit and scope thereof, it is to be understood that the invention is not limited to the specific embodiments thereof except as defined in the appended claims.

What is claimed is:

1. A network scanner system built by connecting at least one computer and N scanners each with an automatic document feeding facility via a network, comprising:

first input means for dividing M pages of originals into L bundles of the originals in correspondence with L number of scanners used for original reading, and inputting a re-arranging order of the L bundles of divided originals set on the L scanners to the computer;

first instruction means for instructing the L scanners to read the divided originals;

reading control means for controlling the L scanners to read the M pages of the originals in accordance with an input instruction from said first instruction means;

transfer means for transferring information of each of the L bundles of the divided originals read by the L scanners to the computer via the network; and re-arranging means for re-arranging the information of the originals transferred to the computer by said transfer means in accordance with the re-arranging order input by said first input means.

2. The system according to claim 1, further comprising display means for displaying scanner names of the N scanners connected to the network on a screen.

3. The system according to claim 2, wherein said display means displays the scanner names in a table format on the screen, and displays, on the table, an instruction column of the re-arranging order of the divided originals, and a confirmation column used by a user to inform the computer that the user set the originals on the L scanners.

4. The system according to claim 3, wherein said first input means inputs the re-arranging order in the instruction column.

5. The system according to claim 3, further comprising second input means for inputting confirmation information in the confirmation column.

6. The system according to claim 2, further comprising checking means for detecting available scanner from the N scanners, and wherein said display means displays only the scanner name of the available scanner on the basis of the checking result of said checking means.

7. The system according to claim 6, further comprising second instruction means for instructing said checking means to detect the available scanner.

8. The system according to claim 6, further comprising:

third input means for inputting a value of the M; and calculation means for calculating optimal numbers of pages of originals to be read by the available scanner on the basis of the value of the M and performance of the available scanner, and wherein said display means displays the calculation result of said calculation means as recommended numbers of pages.

9. The system according to claim 8, wherein the optimal numbers are determined to attain the highest original reading speed as the whole system.

10. The system according to claim 6, wherein said checking means determines the available scanner also in consideration of distances between the computer and the N scanners.

11. The system according to claim 1, wherein said network includes an Ethernet LAN.

12. The system according to claim 6, wherein said checking means checks operation status of the scanners by communicating with all power-on and operable scanners via the network.

13. The system according to claim 12, wherein each of the N scanners includes:
    monitoring means for monitoring own operation status thereof; and
    informing means for, when the scanner is in an available state, issuing a status signal indicating a ready state to the connected computer, and for, when the scanner is occupied by a specific computer to read an original, issuing a status signal indicating a busy state to all other computers, in accordance with a monitoring result of said monitoring means.

14. An original reading method using a system built by connecting at least one computer and N scanners each with an automatic document feeding facility via a network, comprising:
    a first input step of dividing M pages of originals into L bundles of the originals in correspondence with L number of scanners used for original reading, and inputting a re-arranging order of the L bundles of divided originals set on the L scanners to the computer;
    a first instruction step of instructing the L scanners to read the divided originals;
    a reading control step of controlling the L scanners to read the M pages of the originals in accordance with an input instruction in the first instruction step;
    a transfer step of transferring information of each of the L bundles of the divided originals read by the L scanners to the computer via the network; and
    a re-arranging step of re-arranging the information of the originals transferred to the computer in the transfer step in accordance with the re-arranging order input in said first input step.

15. The method according to claim 14, further comprising:
    a checking step of detecting available scanner from the N scanners;
    a second input step of inputting a value of the M; and
    a display step of displaying optimal numbers of pages of originals to be read by the available scanner as recommended numbers of pages on the basis of the value of the M and performance of the ready scanner.

16. A computer program product comprising a computer readable medium having computer program code, for executing original reading, said product including:
    input process procedure codes for executing processing that divides M pages of originals into L bundles of the originals in correspondence with L number of scanners used for original reading, and inputs a re-arranging order of the L bundles of divided originals set on the L scanners to the computer;
    instruction process procedure codes for executing processing that instructs the L scanners to read the divided originals;
    control process procedure codes for executing processing that controls the L scanners to read the M pages of the originals in accordance with the instruction process procedure;
    transfer process procedure codes for executing processing that transfers information of each of the L bundles of the divided originals read by the L scanners to the computer via the network; and
    re-arranging process procedure codes for executing processing that re-arranges the information of the originals transferred to the computer in the transfer process in accordance with the re-arranging order input in the input process.

17. The computer program product according to claim 16, wherein said input process procedure codes, instruction process procedure codes, control process procedure codes, and re-arranging process procedure codes are installed on the computer, and are executed.

18. The computer program product according to claim 16, wherein said transfer process procedure codes are installed on each of the scanners, and are executed.

19. A computer connecting N scanners each with an automatic document feeding facility via a network, comprising:
    input means for inputting a re-arranging order of L (L≦N) bundles summing up to M pages of originals which are divided into the L bundles of the originals in correspondence with L number of scanners used for reading the originals, and are read in by the L scanners;
    instruction means for instructing the L scanners to read the L bundles of divided originals;
    reading control means for controlling reading operation on the L scanners in accordance with an input instruction from said instruction means;
    reception means for receiving information of each of the L bundles of the divided originals read by the L scanners via the network; and
    re-arranging means for re-arranging the information of the originals received by said reception means in accordance with the re-arranging order input by said input means.

20. A reading control step of controlling the L scanners to read the M pages of the originals in accordance with an input instruction in the first instruction step; and
    an original reading method using a computer connecting N scanners each with an automatic document deeding facility via a network, comprising:
    a first input step of dividing M pages of originals into L bundles of the originals in correspondence with L number of scanners used for original reading, and inputting a rearranged order of the L bundles of divided originals set on the L scanners to the computer;
    a first instruction step of instruction the L scanners to read the divided originals;
    a reading control step of controlling the L scanners to read the M pages of the originals in accordance with an input instruction in the first instruction step; and
    a reception step of receiving information of each of the L bundles of the divided originals read by the L scanners to the computer via the network; and
    a re-arranging step of re-arranging the information of the originals received in said reception step in accordance with the re-arranging order input in said first input step.

21. Control process procedure codes for executing process that controls the L scanners to read the M pages of the originals in accordance with the instruction process procedure;
the method according to claim 20, further comprising:
    a checking step of detecting available scanner from the N scanners;

a second input step of inputting available scanner from the M; and a display step of displaying optimal numbers of pages of originals to be read by the available scanner as recommended numbers of pages on the basis of the value of the M and performance of the ready scanner.

22. A computer program product comprising a computer readable medium having computer program code, for inputting image of originals, said product including:

input process procedure codes for executing processing that divides M pages of originals into L bundles of the originals in correspondence with L number of scanners used for original reading, and inputs a re-arranging order of the L bundles of divided originals set on the L scanners to the computer;

instruction process procedures codes for executing processing that instructs the L scanners to read the divided originals;

reception process procedure codes for executing processing that receives information of each of the L bundles of the divided originals read by the L scanners to the computer via the network; and re-arranging process procedure codes for executing processing that re-arranging the information of the originals received in the reception process in accordance with the re-arranging order input in the input process.

* * * * *

UNITED STATES PATENT AND TRADEMARK OFFICE
CERTIFICATE OF CORRECTION

PATENT NO. : 6,122,684
DATED : September 19, 2000
INVENTOR(S) : Masayuki Sakura

It is certified that error appears in the above-identified patent and that said Letters Patent is hereby corrected as shown below:

Title page,
Item 57, ABSTRACT,
"21 Claims," should read -- 22 Claims, --.

Column 10,
Lines 38-40, "A reading ... step; and" should be deleted;
Line 41, "an" should read -- 20. An --;
Line 42, "deeding" should read -- feeding --;
Line 47, "rearranged" should read -- re-arranging --;
Lines 60-63, "Control ... dure:" should be deleted;
Line 64, "the" should read -- 21. The --.

Column 11,
Line 1, "available scanner from" should read -- a value of --.

Column 12,
Line 3, "originals;" should read -- originals; ¶ control process procedure codes for executing processing that controls the L scanners to read the M pages of the originals in accordance with the instruction process procedure; --;
Line 10, "re-arranging" should read -- re-arranges --.

Signed and Sealed this

Eighteenth Day of December, 2001

Attest:

JAMES E. ROGAN
*Attesting Officer*     *Director of the United States Patent and Trademark Office*